United States Patent [19]

Magill

[11] Patent Number: 4,676,483
[45] Date of Patent: Jun. 30, 1987

[54] SELF-FLEETING CABLE WINCH

[75] Inventor: Lawrence Magill, Newtownabbey, Northern Ireland

[73] Assignee: British Telecommunications public limited company, United Kingdom

[21] Appl. No.: 709,086

[22] Filed: Mar. 7, 1985

[30] Foreign Application Priority Data

Mar. 12, 1984 [GB] United Kingdom ............... 8406431

[51] Int. Cl.⁴ ...................... B65H 51/24; B66D 1/36; H02G 1/10
[52] U.S. Cl. ................................ 254/266; 242/47.13; 254/134.3 SC
[58] Field of Search ............ 254/266, 329, 331, 393, 254/407, 413, 417, 371, 373, 134.3 SC, 359; 242/47.13

[56] References Cited

U.S. PATENT DOCUMENTS

| | | | |
|---|---|---|---|
| 2,428,703 | 10/1947 | Ewing | 242/47.13 |
| 2,428,704 | 10/1947 | Ewing | 242/47.13 |
| 2,576,233 | 11/1951 | Lorig | 242/47.13 |
| 3,258,247 | 6/1966 | Jones, Jr. et al. | 254/311 |
| 4,218,025 | 8/1980 | Andrews | 242/47.13 |
| 4,440,353 | 4/1984 | Shelton et al. | 242/47.13 X |

FOREIGN PATENT DOCUMENTS

| | | | |
|---|---|---|---|
| 1178761 | 5/1959 | France | 242/47.13 |
| 615287 | 1/1949 | United Kingdom | 242/47.13 |

OTHER PUBLICATIONS

EPO Search Report dated Aug. 12, 1985 on EPO Appln. No.85301598.

Primary Examiner—Stuart S. Levy
Assistant Examiner—Joseph J. Hail, III
Attorney, Agent, or Firm—Nixon & Vanderhye

[57] ABSTRACT

A winch drum (1) is designed to operate without fleeting knives.

The winching surface of the drum (1) is made up of fingers (6) which reciprocate axially along the drum (1) during use. The design is such that, in use, a major proportion of the fingers (6) are always moving in the same direction along the drum (1). This has the effect that the turns of an element being winched are both spaced and continuously progressed along the winching surface of the drum (1).

The invention has particular application in the laying and taking up of submarine optical fibre cables.

13 Claims, 5 Drawing Figures

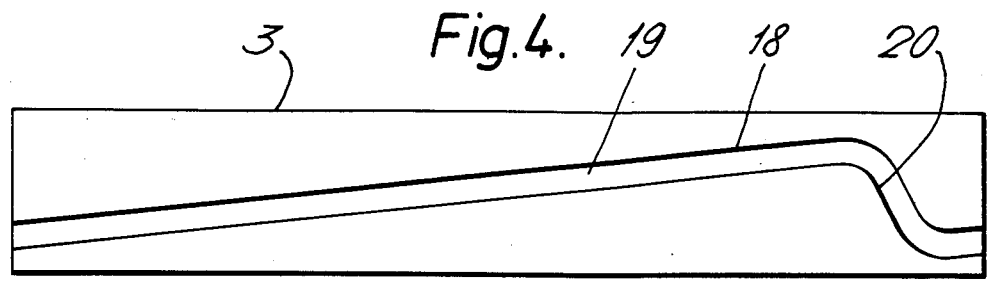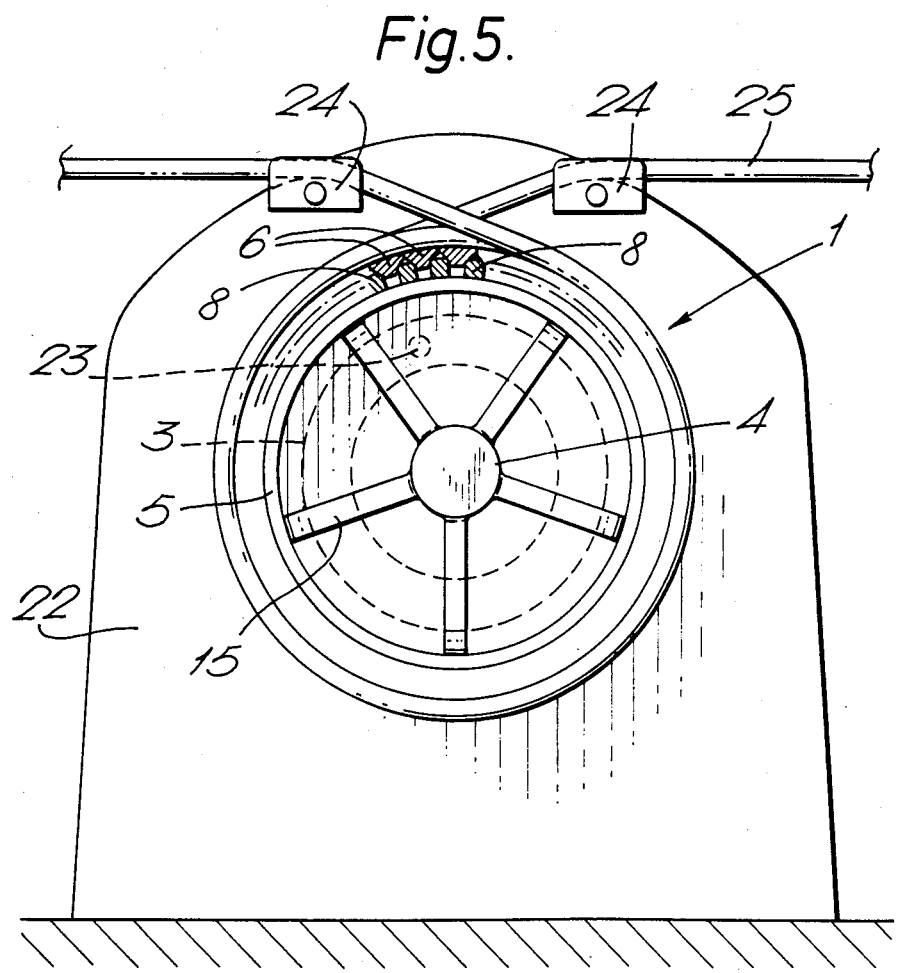

SELF-FLEETING CABLE WINCH

The present invention relates to winch drums and particularly but not exclusively to winch drums for use in picking up or paying out submarine cable.

A winch drum can be used, alone or in combination with other components, to take up all or part of a tensile load which may be present in a longitudinal element, such as a chain or cable, during picking up or paying out of the element. In use, the element passes round the drum and slippage between the element and the winch drum surface is prevented by arranging that a minimum preselected number of turns of the element are present around the drum; the number is chosen such that the total friction existing between the element and the winch drum surface is sufficient to prevent such slippage.

It is commonly the case that a winch drum is used to provide motive power in manipulating an element but not storage capacity for the element. The number of turns of the element about the drum may then be kept to the minimum preselected number. They are made adjacent to one another on the drum, in a single layer, to form a helix. In order to pick up or pay out the element, the drum is rotated so that the element feeds onto the drum at one end of the helix and off the drum at the other end of the helix.

Each new turn of the element which is fed onto the drum must be guided to lie to the side of the turn before it in order that the single layer configuration of turns be maintained. This has the effect that, as the drum rotates in one direction, the helix of turns progresses axially along the drum. However great the length of the drum, the number of rotations the drum can make before the helix approaches one end of it will always be limited. A known solution to the above limitation is to provide fleeting knives which act to slide the turns of the helix back along the drum. Each fleeting knife presents a diverting surface with which the element makes sliding contact shortly after being fed onto the drum. The knife is positioned next to the first turn that the element makes about the drum and acts continuously to push that turn to one side, along the drum. As a consequence, each further turn in the helix, and therefore the whole helix, is continuously moved along the drum.

There can be drawbacks to the use of fleeting knives, however. Considerable forces may be involved. For instance, a submarine communication cable can be under a tensile load of 45 tons during laying or picking up. It is estimated that in such a case the force exerted by the fleeting knife may be 30 tons. The fleeting knife must therefore be a powerful additional piece of equipment to the cable drum, which must be installed and maintained. If the direction of rotation of the cable drum is reversible, as is generally the case, a fleeting knife must be available at each end of the drum.

The element can be damaged by the sliding contact with the fleeting knife and drum surface, or by discontinuities in the width of adjacent turns which are forced together. If a substantially thickened portion of element is encountered, for instance, as presented by a repeater housing on a communication cable, then the fleeting knife must be temporarily repositioned which expends time and labor.

Two further disadvantages are that the fleeting knife inevitably acts as a brake on the rotation of the drum and the force exerted by the knife, for instance the 30 tons referred to above, must be transferred from the knife to its mountings. In the case of a winch drum installed on a cable ship, this means the force is transferred to the ship's structure.

It is an object of the present invention to provide a winch drum which can operate without the use of fleeting knives.

The present invention provides a winch drum whose winching surface is divided into a plurality of segments adapted for axial reciprocation relative to the drum such that, in use, a major part of the surface moves in one direction and a minor part of the surface moves in the reverse direction.

Preferably the winch drum includes camming means adapted to co-operate with the segments to generate said reciprocation.

Winch drums according to the present invention have the advantage that the only driving force that may be necessary in use of the winch drum is the force supplied to the drive shaft of the winch drum.

A further advantage is that such winch drums are relatively simple to manufacture and maintain.

A cable winch drum according to an embodiment of the invention will now be described with reference to the accompanying figures in which:

FIG. 4 shows the outer curved surface of a camming ring for use in the winch drum, the surface being shown opened out into a planar rectangle, and FIG. 5 shows a front elevational view of the winch drum, in use.

Figure 1:
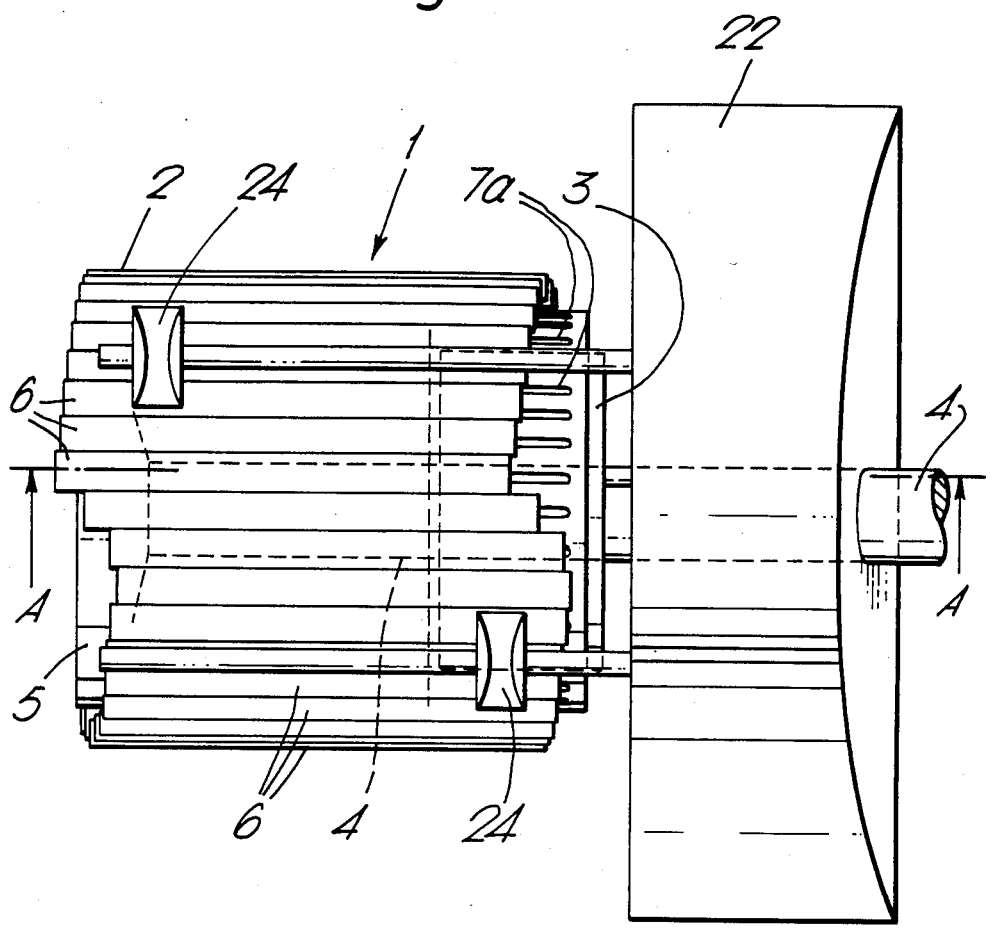
FIG. 1 shows a plan view of the winch drum.

Referring to FIG. 1, the winch drum 1 comprises a rotatable cylinder 2, mounted on a drive shaft 4, and a camming ring 3 mounted coaxially in the end of the cylinder 2. The winching surface of the cylinder 2 is constructed out of a plurality of axial fingers 6 mounted on an internal frame 5.

The arrangement is such that the cylinder 2 rotates relative to the camming ring 3, the fingers 6 being driven by the camming ring 3 to reciprocate in an axial direction along the drum 1.

Figure 2:
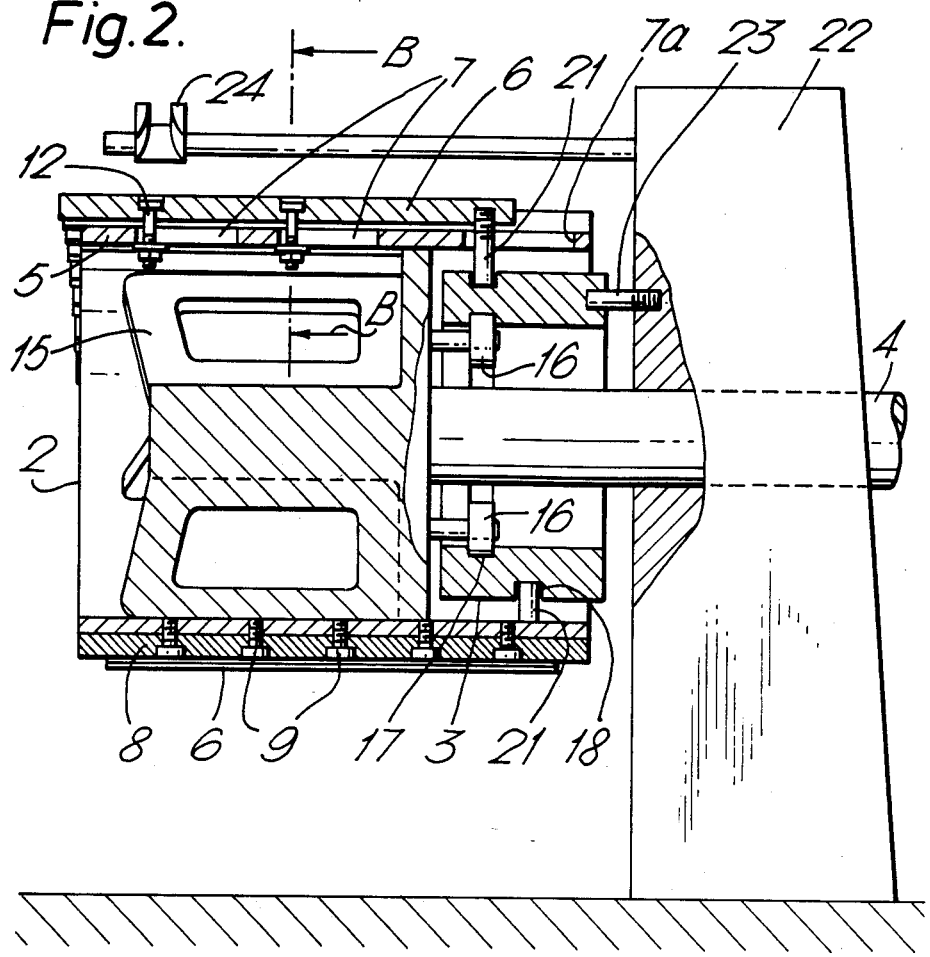
FIG. 2 shows a cross section taken along the line A—A in FIG. 1 in the direction indicated by the arrows.
Figure 3:
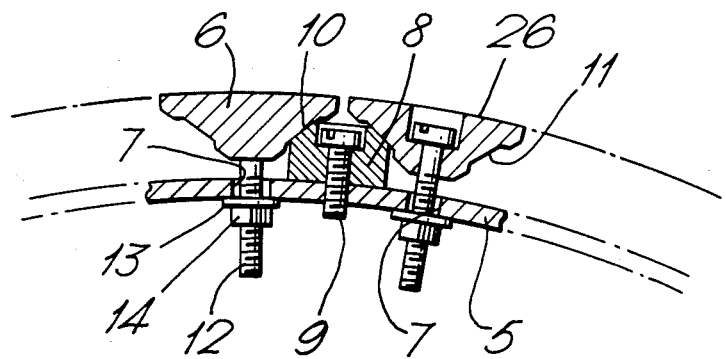
FIG. 3 shows a partial cross section taken along the line B—B in FIG. 2 in the direction indicated by the arrows.

Referring to FIGS. 2 and 3, each finger 6 is retained on the internal frame 5 by means of bolts 12, so as to be axially slidable between two bearing members 8. In more detail, the arrangement is as described below.

The internal frame 5 comprises a hollow cylinder with a regular array of slots 7 extending through its wall. The slots 7 are arranged in forty rows of three, each row extending parallel to the cylinder's axis.

Mounted on the internal frame 5 between the rows of slots 7 are bearing members 8. Each bearing member 8 comprises a strip of material which extends the length of the internal frame 5. The cross section of each bearing member 8, as shown in FIG. 3, is substantially in the shape of a rectangle with two adjacent corners bevelled. The bevelled corners 10 are directed outwards from the frame 5 and the bearing members 8 are mounted on the frame 5 by means of recessed screws 9.

The fingers 6 are also equal in length to the internal frame 5. In cross section each finger 6 is substantially in the shape of a shallow triangle whose base is slightly convex. Further, each side of the triangle has a shallow recess 11, complementary in shape to the bevelled corners 10 of the bearing members 8. Bearing material is embedded in each recess 11. There are forty fingers 6 and each finger 6 is mounted on the internal frame 5 over and parallel to a row of slots 7. The fingers 6 are dimensioned such that they can each be mounted between a pair of bearing members 8, the bevelled corners 10 of the bearing members 8 extending into the shallow recesses 11 to lie in contact with the bearing material. The axes of curvature of the convex surfaces 26 of the fingers 6, which are outermost, coincide with the axis of the frame 5.

Each finger 6 is held in place by means of two bolts 12. Each bolt 12 extends through both the associated finger 6 and a respective slot 7 below. Washers 13 made of bearing material receive the shaft of each bolt 12 beyond the relevant slot 7 and nuts 14 are provided which, with the washers 13, prevent withdrawal of the bolts 12 from the slots 7. The heads of the bolts 12 are recessed below the convex surfaces 26 of the fingers 6.

It should be noted that one slot 7a of each row of slots 7 remains without a bolt 12. This slot 7a overlies the camming ring 3 which is mounted in the end of the cylinder 2. The purpose of these slots 7a is described below.

The winch drum 1 and the camming ring 3 are arranged with respect to each other in the following manner.

The internal frame 6 is fixedly mounted on a drive shaft 4 by means of a set of spokes 15 and the drive shaft 4 is coupled to a winch motor (not shown). Inside one end of the frame 5, mounted coaxially between the drive shaft 4 and the frame 5, is the camming ring 3. The camming ring 3 has a cylindrical outer surface and is free to rotate relative to the shaft 4 and frame 5. It is mounted by means of rollers 16 which in turn are mounted on the spokes 15 supporting the frame 5. The rollers 16 are received in an annular recess 17 in the inner surface of the camming ring 3. In the outer surface of the ring 3, there is provided a continuous cam groove 18.

Referring to FIG. 4, the developed profile of the cam groove 18 is divided into a traverse section 19 and a return section 20. The traverse section 19 is straight and extends along 95% of the circumferential length of the outer surface of the ring 3 (i.e., subtending an angle of 342 degrees at the center of the ring). The return section 20 has the form of a constant acceleration curve and extends the remaining 5% of the circumferential length of said surface. In another embodiment, the advancing section 19 subtends an angle of at least 240 degrees at the center of the ring.

Referring again to FIG. 2, each finger 6 is provided with a cam follower 21. The cam followers 21 are positioned towards the end of each finger 6 which overlies the camming ring 3. Each cam follower 21 extends through its adjacent slot 7a in the internal frame 5 and locates in the cam groove 18. It should be noted that the adjacent slot 7a concerned will be the slot 7a of each row with no associated bolt 12.

The drive shaft 4 of the winch drum 1 is supported by a mounting 22. The mounting 22 is equipped with a fixed projection 23 which extends into a recess in the camming ring 3, thereby preventing its rotation relative to the mounting 22, or to the winch drum 1.

Referring to FIG. 5, the mounting 22 also provides support for guides 24 for use in guiding whatever longitudinal element is to be winched onto and off the winch drum 1. Guides 24 suitable for use in this type of application are known and they are not therefore described herein.

Referring to FIGS. 2 and 5, in use four turns of an element such as a cable 25 are placed around the winch drum, the guides 24 being used to guide the cable 25 onto and off the drum. The two guides 24 are positioned such that for a short part of the circumference of the drum, which lies between the guides 24, only three turns of cable 25 are present on the drum. The camming ring 3 is positioned such that the return section of the cam groove 18 lies below the gap between the guides 24.

The internal frame is rotated at a constant velocity by means of the drive shaft 4. Because the camming ring 3 is prevented from rotating with the internal frame 5 by means of the projection 23 on the mounting block 22, the cam follower 21 provided on each finger 6 will follow the groove 18 in the camming ring 3. Each finger 6 is only free to move axially along the internal frame 5 and the result of relative rotation between the frame 5 and the camming ring 3 is that each finger 6 will, driven by its cam follower 21, reciprocate along its respective pair of bearing members 8 in an axial direction relative to the frame 5. The amplitude of the reciprocation will clearly be determined by the shape of the groove 18 while the velocity of the reciprocation will be determined both by the shape of the groove 18 and the speed of rotation of the internal frame 5 relative to the camming ring 3.

It can be calculated that if the groove 18 shows the traverse section 19 and return section 20 described with reference to FIG. 4, then during rotation of the internal frame 5, a minimum of thirty seven fingers will always be moving in one direction at the same velocity along the frame 5 and a maximum of three fingers 6 will be returning in the opposing direction along the frame 5. The velocity of return, due to the form selected for the return section 20 of the groove 18, is such that acceleration of the fingers 6 in an axial direction along the drum during return is kept constant.

The result of the above arrangement in use is that the turns of cable 25 present on the drum will be carried along the drum in an axial direction by the fingers 6 as the drum rotates. The turns of the cable 25 will move in the direction that the fingers 6 move while following the traverse section 19 of the groove 18 since the great majority of the fingers 6 will be moving in that direction, as mentioned above.

It is preferable that the return section 20 of the groove 18 should lie in the short part of the circumference of the drum which lies below the gap between the guides 24 where only three turns of cable 25 are present. This further reduces any effect due to the three or fewer fingers 6 which are following the return section 20 of the groove 18.

If the direction of rotation of the drum were to be reversed, no adjustment of the apparatus would be necessary. The fingers 6 would follow the groove 18 in the reverse direction and carry the turns of cable 25 in the other axial direction along the drum.

The amplitude of reciprocation of the fingers 6 can be selected such that the distance between the turns of the cable 25 on the drum is great enough to accommodate the maximum thickness of cable 25 likely to be encountered during winching. In this way, changes in thickness of the cable 25, such as are produced by repeater housings along a submarine communications cable, can be allowed for in advance with no adjusting action being necessary after a winching operation has started. In order to change the amplitude of reciprocation, a range of different camming rings 3 may be provided, each having a differently pitched groove 18.

If the winch drum 1 described above is to be used for paying out or picking up optical fibre submarine cables then the arrangement may be such that the curved, outermost surfaces of the fingers 6 provide a cylindrical surface of diameter 3 m or more. With known optical fibre submarine cables this is to be preferred as the cables are susceptible to damage if bent to any greater degree at any point. The guides 24 in this case would of course also have to be designed to prevent overbending of the cable. It may not, however, be necessary for use with other elements that the outermost surfaces of the fingers 6 are curved although it is preferable in general in order to avoid damage to the element.

In a variation to the embodiment of the invention described above, it may be advantageous that the camming ring 3 is not fixed relative to the mounting block 22. Instead it can be driven to rotate at preselected speeds, for instance through selectable gearing from the winch drum drive shaft 4. By changing the relative rates of rotation of the camming ring 3 and the winch drum 1, the spacing between turns of a cable 25 on the drum 1 can be varied. This would be preferable for instance when dealing with a repeater in an optical fibre cable. The diameter of a repeater is generally considerably greater than that of the associated cable and increased spacing is therefore needed between the cable turns lying adjacent a repeater on the winch drum 1.

Other variations may be made in the arrangement described without departing from an embodiment of the invention. For instance, it is not necessary that all the fingers 6 should reciprocate. It is merely necessary that a greater number of fingers should move simultaneously in one axial direction along the frame 5 than the number of fingers 6 which are stationary or moving in the opposing axial direction.

It is preferred, but not necessary, that the fingers 6 should follow the return section 20 of the groove 18 under conditions of constant acceleration. Such an arrangement is more important where the element to be winched is particularly liable to damage related to the sliding action of the fingers 6 against the outer surface of the element.

It is not necessary that forty reciprocating fingers 6 be provided. The arrangement can be made to function with only seven fingers 6 reciprocating but the greater the number the smoother can be the action of the drum on the element concerned and the less disruption may be caused by the returning fingers 6. Forty fingers 6 has been found to be an optimum number, balancing the cost of providing more fingers 6 against the effectiveness of the winch drum 1 produced, in the case of drums for winching optical fibre submarine cables.

Further, it will be clear that the number of bolts 12 holding each finger 6 in place may be altered to more or less than two.

I claim:

1. A winch for cables comprising:
   a frame supporting a drum having a winching surface for receiving the cable;
   means for rotating the drum,
   said winching surface including a plurality of axially extending segments and means for reciprocating the segments in an axial direction by advancing a major proportion of the segments in a first direction and returning a minor proportion in the opposite direction during drum rotation with the segments remaining in substantial contact with the cable during the return motion.

2. The winch defined in claim 1 wherein the winching surface is entirely composed of reciprocatable segments.

3. The winch defined in claim 1 wherein the means for reciprocating comprises a cam surface that cooperates with a cam follower located on each of the segments.

4. The winch defined in claim 3 wherein the cam surface comprises a ring mounted coaxially with respect to the drum, the ring having a groove that mates with the cam followers on the segments and the drum being capable of rotation relative to the ring.

5. The winch defined in claim 4 further comprising means for rotating the ring, said means enabling a variable rate of rotation of the ring with respect to the drum.

6. The winch defined in claim 4 or claim 5 wherein the groove has an advancing section and a return section and the advancing section subtends an angle of at least 240 degrees at the center of the ring.

7. The winch defined in claim 4 or claim 5 wherein the groove has an advancing section and a return section and the advancing section subtends an angle of at least 342 degrees at the center of the ring.

8. The winch defined in claim 1 wherein said means for reciprocating further comprises means for varying the rate of reciprocation for a given rate of drum rotation.

9. The winch defined in claim 1 or claim 8 wherein said means for reciprocating imparts constant acceleration to the segments during the return motion.

10. A self-fleeting submarine cable winch for frictionally engaging a predetermined length of submarine cable coiled thereabout in a helix and exerting multi-ton tensile forces on the cable, said cable winch comprising:
    a rotatable frame;
    a plurality of axially-extending linear segments arrayed about the circumference of a cylinder on said frame so as to define a cable winching surface at radial outer surfaces of said segments;
    each said segment being individually shiftable in a first axial direction while being frictionally engaged by cable sections wrapped thereon and having a cam follower structure which extends radially inwardly;
    a cam track formed in a cylindrical cam element and disposed to receive said cam follower structures therewithin, said cam track being formed to include a section pitched in a first axial sense over a substantial majority of the circumference and having a second return-shaped section pitched in a second and opposite axial sense over the remainder of the circumference and disposed at a predetermined circumferential location to complete a continuous cam track about the entire circumference; and
    means for rotating said frame with respect to said cam element and with respect to the environment whereby the tensile forces of a submarine cable being laid down into or taken up from a body of water are engaged by a helically-wrapped section of the submarine cable carried by said cable winching surface while cam-induced axial movements of the individual segments are produced in both said first axial sense and said second return axial sense while a substantial portion of said cable is engaged with said segments during both said axial movements to effect a self-fleeting function.

11. A self-fleeting submarine cable winch as in claim 10 further comprising:
  first cable guide means disposed at a first angle with respect to the axis of the rotatable frame for placing incoming cable onto the cable winching surface at a predetermined location; and
  second cable guide means disposed at a second angle with respect to the axis of the rotatable frame for taking outgoing cable from the cable winching surface at a predetermined location;
  said first and second cable guide means being positioned and spaced such that there are N cable sections in contact with the winching surface in a first angular interval greater than 180 degrees and there are N−1 cable sections in contact with the winching surface in a second angular interval;
  said second return-shaped section of the cam track being disposed within said second angular interval between said first and second guide means.

12. A self-fleeting submarine cable winch as in claim 11 wherein said substantial majority of the circumference comprises approximately 95% of the circumference.

13. A self-fleeting submarine cable winch as in claim 12 comprising on the order of forty of said segments and wherein, at any given time, a plurality of such segments are being axially returned via said return-shaped section of the cam track.

* * * * *